US005677026A

United States Patent [19]

Santoli

[11] Patent Number: 5,677,026
[45] Date of Patent: Oct. 14, 1997

[54] SELF-STANDING INSULATING JACKET FOR A HOT WATER TANK

[76] Inventor: Michael Santoli, 7464 Tyler Blvd., Mentor, Ohio 44060

[21] Appl. No.: 436,581

[22] Filed: May 8, 1995

[51] Int. Cl.$^6$ ........................................ B32B 9/00
[52] U.S. Cl. .................... 428/76; 428/64; 428/68; 428/69; 428/71; 428/80; 428/81; 428/99; 428/102; 428/294; 428/320.2; 264/46.6; 264/46.9; 264/257; 264/267; 126/361; 126/437; 126/450; 122/494
[58] Field of Search ...................... 428/99, 102, 76, 428/294, 80, 81, 83, 71, 69, 68, 64, 320.2; 264/46.6, 46.9, 257, 267; 126/361, 437, 450; 122/494

[56] References Cited

U.S. PATENT DOCUMENTS

| | | |
|---|---|---|
| 1,609,858 | 12/1926 | Bohon . |
| 2,099,740 | 11/1937 | Kieselbach . |
| 3,125,091 | 3/1964 | Sleeper, Jr. . |
| 3,785,375 | 1/1974 | Lipson . |
| 3,906,129 | 9/1975 | Damois . |
| 4,157,713 | 6/1979 | Clarey . |
| 4,267,824 | 5/1981 | O'Halloran . |
| 4,520,793 | 6/1985 | Hall . |
| 4,865,014 | 9/1989 | Nelson . |
| 4,972,759 | 11/1990 | Nelson . |

*Primary Examiner*—Patrick Ryan
*Assistant Examiner*—Abraham Bahta

[57] ABSTRACT

An inflatable, self-standing, transparent insulating jacket for a hot water tank is disclosed. The jacket is comprised of an inflatable hood, a platform and an attachment means. The hood surrounds, but is spaced outwardly from, the hot water tank. The hood comprises transparent inner and outer members each defining a cylindrical chamber and having an open end and a peripheral edge surround the open end. The inner and outer member edges are bonded together at or near their respective peripheral edges so as to form an impermeable fluid tight inflatable pocket between the members. A valve is provided on the outer member to inflate and deflate the inflatable pocket. The platform, having an outer diameter greater than the outer diameter of the hood, is disposed beneath the hot water tank. The attachment means, preferably a zipper type fastener, secures the hood to the platform. A zipper half attached to an outer surface of the hood's outside member coacts with a corresponding zipper half attached to the platform's top surface to secure the hood to the platform.

13 Claims, 3 Drawing Sheets

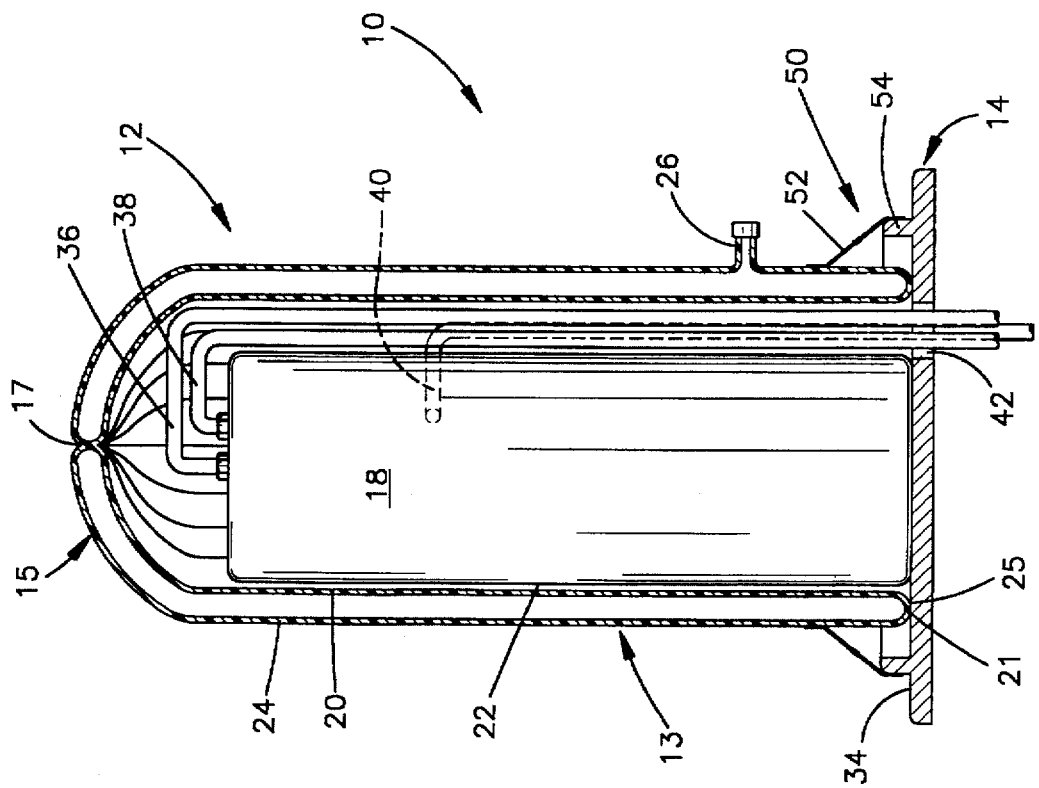
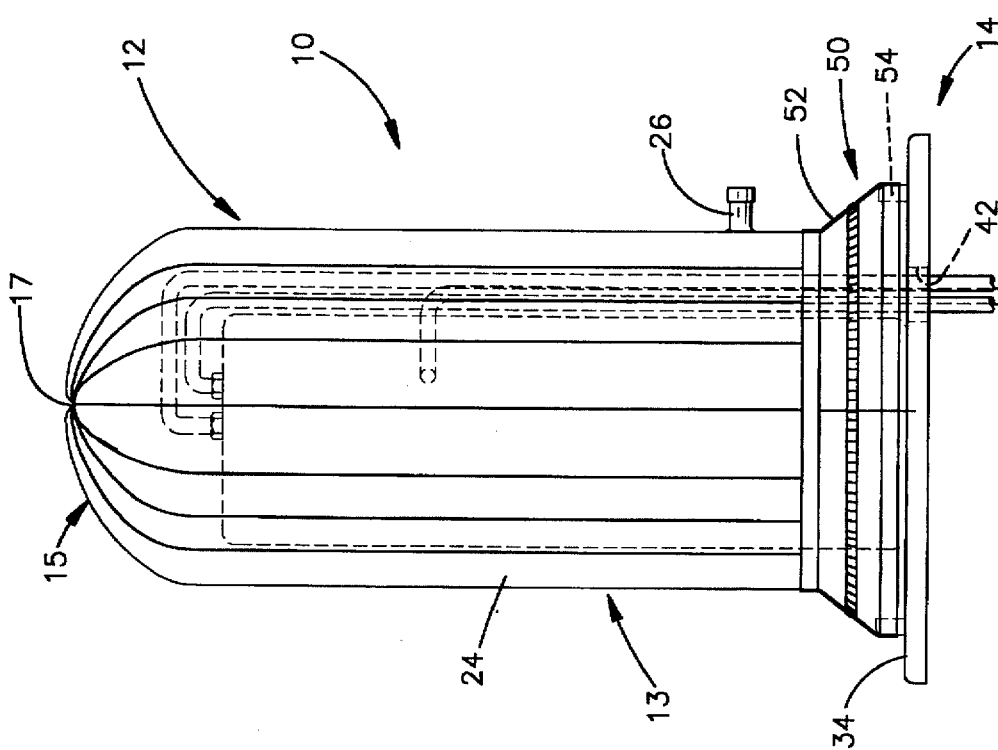

1

SELF-STANDING INSULATING JACKET FOR A HOT WATER TANK

FIELD OF THE INVENTION

This invention relates to insulating jackets for hot water tanks. More particularly, this invention relates to inflatable, self-standing hot water tank jackets which both insulate the tank and facilitate solar heating of the water in the tank.

BACKGROUND OF THE INVENTION

Insulating jackets for hot water tanks and boilers can be classified into two general categories; flexible insulating jackets and rigid insulating jackets. Flexible insulating jackets utilize insulating materials such as flexible urethane foam or fiberglass. Rigid insulating jackets utilize insulating materials such as urethane foam or polyisocyanurate foam. While the rigid insulating materials have superior insulating characteristics as compared to the flexible insulating jackets, both types of insulating jackets have numerous disadvantages.

First, because of the opaque nature of fiberglass, flexible urethane, urethane foam, polyisocyanurate foam and other insulating materials used in either flexible or rigid insulating jackets, sunlight is prevented from reaching the surface of the hot water tank. Therefore, no solar heating of the water in the tank can occur.

Rigid insulating material such as urethane foam is normally fabricated in solid rectangular blocks or cylinders. Thereafter, an appropriately shaped cavity must be "hollowed out" of the urethane block or cylinder to encapsulate the hot water tank to be insulated. Typically, to facilitate removal of material, the urethane block or cylinder is split in half and each half is machined separately. Not only is the material removed from the urethane block or cylinder wasted, but there is a significant cost associated with machining out the cavity. In addition, when installing the foam half pieces around the tank, care must taken since the rigid foam is prone to breaking and crumbling.

Flexible insulating jackets do not have sufficient rigidity to be self standing. Thus, either the insulating material must be wrapped around or draped over and fastened to the hot water tank or a suitable support structure must be provided to position the insulation material to properly surround the outer surface of the tank.

Both the wrapping/draping method and the structural support alternatives have drawbacks. Wrapping insulation around a tank or draping the insulation over a tank and fastening it to the tank are time consuming operations because care must be taken to make sure the insulation is tightly napped and a securely attached to the tank. Moreover, caution must be exercised to avoid puncturing or tearing the waterproof inner liner of the insulation jacket during installation. Since the jacket is in contact with the tank, condensation on the outer surface of the tank will soak the insulation material rendering it ineffective if the inner liner of the jacket is punctured or torn.

If a structure is provided to support the insulation in proper position surrounding the tank, additional costs relating to the fabrication of the structure and affixing or attaching the insulation material to the structure will be incurred.

Finally, all of the insulating jackets described above, whether flexible or rigid, are bulky and have a relatively low density thereby making inefficient use of storage space.

SUMMARY OF THE INVENTION

An object of this invention is to provide a self-standing jacket for a hot water tank which both insulates the tank and facilitates solar heating of the water tank. Another object of this invention is to provide an insulating jacket for a hot water tank which is easy to install and remove. A further object of this invention is to provide an insulating jacket for a hot water tank which is inexpensive to manufacture. Still another object of this invention is to provide an insulating jacket for a hot water tank which requires minimal storage space when in inventory.

Broadly, the invention includes an inflatable, transparent hood which encapsulates, but is spaced outwardly from, the hot water tank, a platform disposed beneath the tank and an attachment means which secures the hood to the platform. The hood comprises two transparent members, as inner member and an outer member, each defining a U-shaped cylindrical chamber and having an open end. The inner and outer members are bonded together at or near the peripheral edge surrounding each member's respective open end forming an impermeable fluid tight inflatable pocket between the inner and outer members.

Preferably, the attachment means securing the hood to the platform is a zipper type fastener. A first rectangular strip having a zipper half along a longitudinal edge is bonded to the hood's outer surface at or near the outer member's peripheral edge. A second rectangular strip also having a zipper half along a longitudinal edge is bonded to a top surface of the platform. The two zipper halves are zipped together to secure the hood to the platform.

In a second embodiment of the invention, a platform is not used. The platform is replaced by a skirt having a zipper half along one longitudinal edge. The skirt zipper half is zipped to the hood's zipper half to secure the hood to the skirt. The portion of the skirt extending away from the zipper half is anchored to the ground by covering it with earth, stones other suitable material.

This and other objects, advantages and features of the invention will become better understood from a detailed description of a preferred embodiment which is described in conjunction with the accompanying drawings.

BRIEF DESCRIPTION OF THE DRAWINGS

FIG. 1 is a perspective view of an insulating jacket constructed in accordance with the present invention as installed over a hot water tank;

FIG. 2 is a sectional view of the insulating jacket of FIG. 1; and

DESCRIPTION OF THE PREFERRED EMBODIMENT

Figure 3:
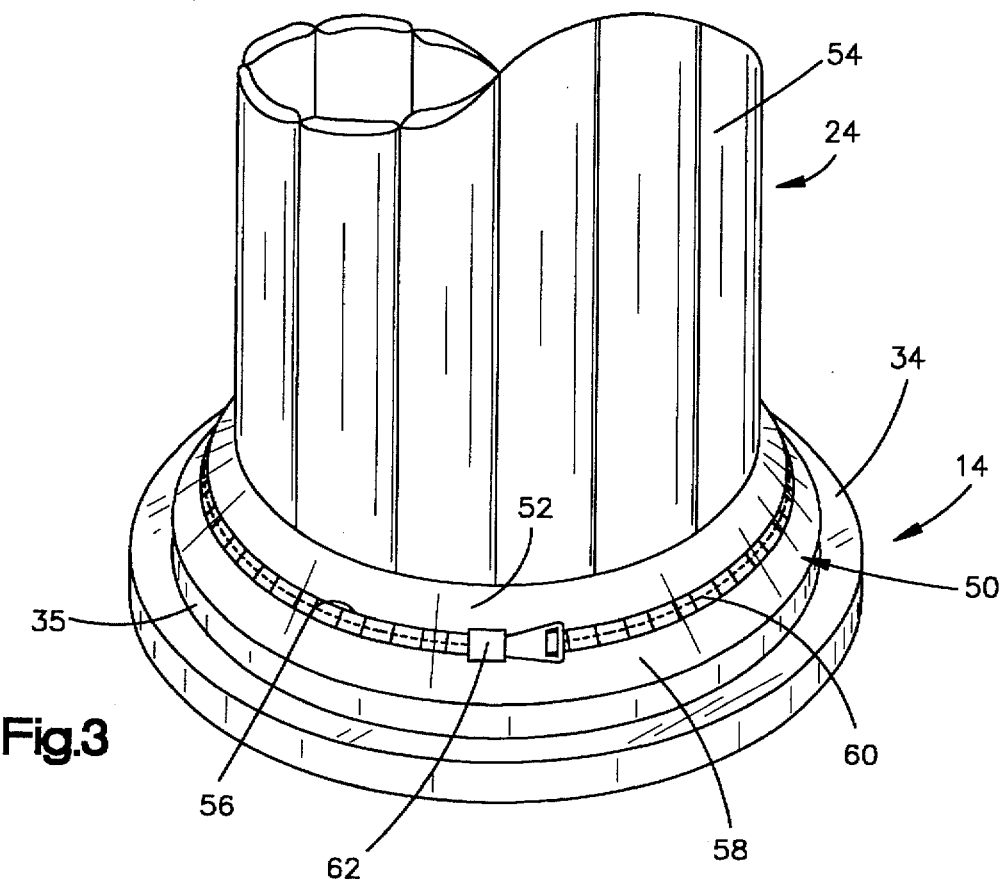
FIG. 3 is an enlarged perspective view of a portion of the insulating jacket of FIG. 1 showing the attachment structure between the insulating jacket's hood and the platform.

FIG. 1 illustrates a self-standing, insulating jacket of the present invention, shown generally as 10. The jacket 10 is comprised of a hood 12, a platform 14, and an attachment means 50 which secures hood 12 to platform 14. Hood 12 has an inner diameter approximately twelve inches greater than the outside diameter of a hot water tank 18. When installed, as can most clearly be seen in FIG. 2, the hood 12 is disposed around the tank 18 so as to define an annular clearance space of approximately six inches between the hood's inner member 20 and the tank's outer surface 22. The annular clearance provides dead air space which serves to insulate the tank 18.

The hood 12 is comprised of inner member 20 and outer member 24. Both the inner and outer members 20, 24 are U-shaped when viewed in longitudinal cross section. Each member 20, 24 defines an interior cylindrical chamber having an open end. Each member's open end includes a peripheral edge 21, 25 surrounding the open end. The interior chamber defined by the outer member 24 is larger than the chamber defined by the inner member 20. The inner and outer members 20, 24 are bonded together at or near their respective peripheral edges 21, 25 using a suitable adhesive or by pleating so as to form an impermeable fluid tight pocket between the members. When installed over a tank 18, the hood 12 includes an upstanding portion 13 and generally a domed portion 15. The size differential between the outer and inner members 20, 24 should be such that the width of the pocket formed between the inner and outer members when the hood is fully inflated is in the range of four to six inches. Preferably, the inner and outer members 20, 24 are comprised of transparent polyvinyl chloride having a thickness of approximately 6 mils.

When the hood 12 is inflated, inner and outer members 20, 24 in the upstanding portion 13 are concentric and may be pleated together at spaced apart parallel vertical segments, as shown in FIG. 1, forming a series of vertical cylindrical-shaped channels having a cross-section of approximately six inches in diameter. The pleated segments may continue into the domed portion 15 of the hood in which case, the pleats will converge at an apex 17. Pleating together the hood's inner and outer members 20, 24 increases the rigidity of the hood, although it should be understood that the hood may be suitably constructed without pleating the inner and outer walls.

Figure 5:
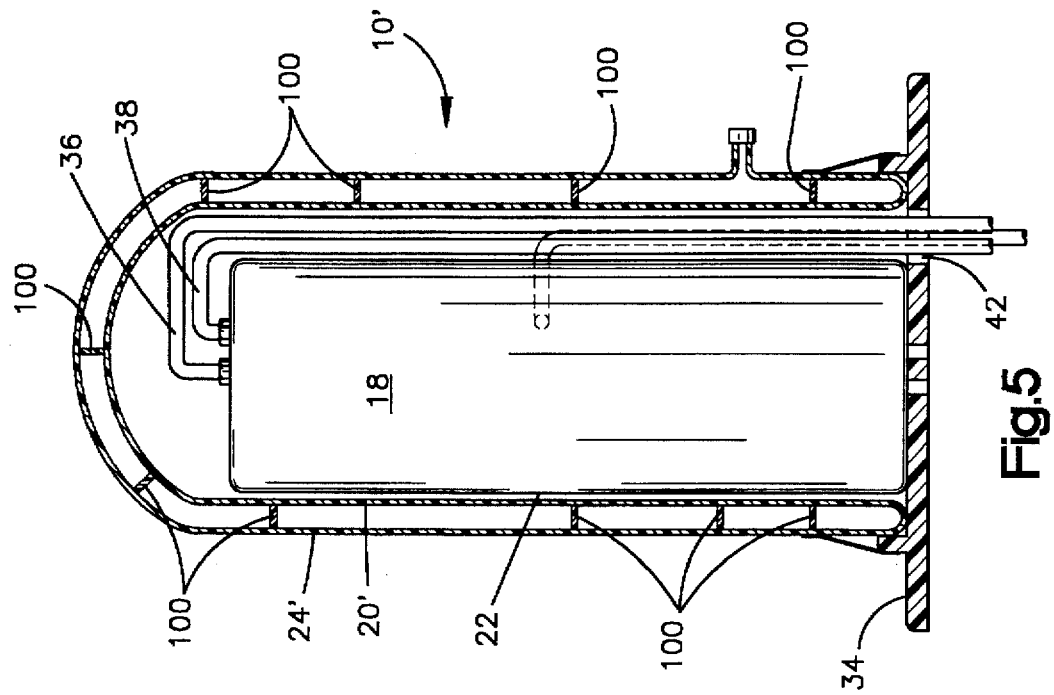
FIG. 5 is an alternate embodiment of an insulating jacket without vertical pleating.

FIG. 5 shows an alternate embodiment of a jacket of the present invention designated as 10'. In this embodiment, a hood 12' comprises an inner member 20' and an outer member 24' bonded together at their peripheral edges as set forth in the embodiment described above. However, in this embodiment, the hood's inner and outer members 20', 24' are not pleated together to form a series of vertical cylindrical channels. Instead, a plurality of cross members 100 extending between and couple the inner and outer members 20', 24' to maintain the desired spaced apart relationship between the members 20', 24' so that the hood 12' is self-standing when inflated. While the length of the cross members 100 is determined by the desired spacing between the inner and outer members 20', 24' (4 to 6 inches), the width of the cross members may varying from a relatively short ribbon-like member (say, for example 1" in width) attached to the inner and outer members to a wider arcuately shaped member which may have a width of a foot or more.

Returning to FIGS. 1 and 2, a valve 26, of conventional design, located on outer surface 24 permits inflation and deflation of the hood 12. When inflated, the hood 12 is self-standing. If desired, one of the vertical pleat segments can be slit and a zipper installed (not shown) to provide access to the tank 18 without the necessity of removing the hood 12 from the platform 14.

Since the hood's inner and outer members 20, 24 are transparent, sunlight can penetrate the hood and strike the tank's outer surface 22, thereby heating the water in the tank.

The platform 14 is disposed beneath hot water tank 18. Preferably, platform 14 is disk shaped and is comprised of a material which has excellent insulating and weight bearing characteristics and is durable, e.g., high impact polyvinyl chloride. The platform's upper surface 34 is relatively flat over the area of the surface on which the tank 18 will rest and preferably, includes a raised annular ridge 35 having a diameter greater than a diameter of the hood outer member 24. The ridge will facilitate securing the hood 12 to the platform 14 as will be described. The thickness of platform 14 will depend on the weight of the tank 18 when full and the weight bearing properties of the material used to fabricate the platform. The platform 14 will have one or more apertures, shown generally as 42, of appropriate cross-sectional to provide for the tank's inlet and outlet pipes 36, 38 and electrical connections 40. Optionally, one or more flanges (not shown) may be attached to the outer periphery of platform 14. The flange(s) may be covered with earth or set in concrete to provide additional stability to the insulating jacket.

This attachment means 50 serves to secure hood 12 to platform 14. In the preferred embodiment, the attachment means is comprised of a zipper type connection between the hood 12 and the platform 14. As can most clearly be seen in FIG. 3, a first rectangular strip 52 having a length substantially equivalent to a circumference of the hood's outer member 24 is attached to an outer surface 54 of the hood's outer member 24 near and parallel to the peripheral edge 25 of the outer member 24. The strip 52 includes a half zipper 56 which extends along an edge of the strip not attached to the outer member outer surface 54.

A second rectangular strip 58 is attached to the upper surface 34 of the platform 14. Preferably, as shown most clearly in FIGS. 2 and 3, the second strip 58 is attached to the raised annular ridge 35 extending from the platform's upper surface 34. The second strip 58 includes a zipper half 60 along an edge of the strip not attached to the platform ridge 35. When the first strip's half zipper 56 is properly aligned with the second strip's half zipper 60, a zipper fastener 62 is used to interlock the half zippers 54, 58 thereby securing hood 12 to platform 14. Although the preferred attachment means is the zipper type connection disclosed above, it should be recognized that other attachment means snaps, buttons, rivets, drawstrings, laces, VELCRO strips, etc. may be used to secure the hood 12 to the platform 14.

Figure 4A:
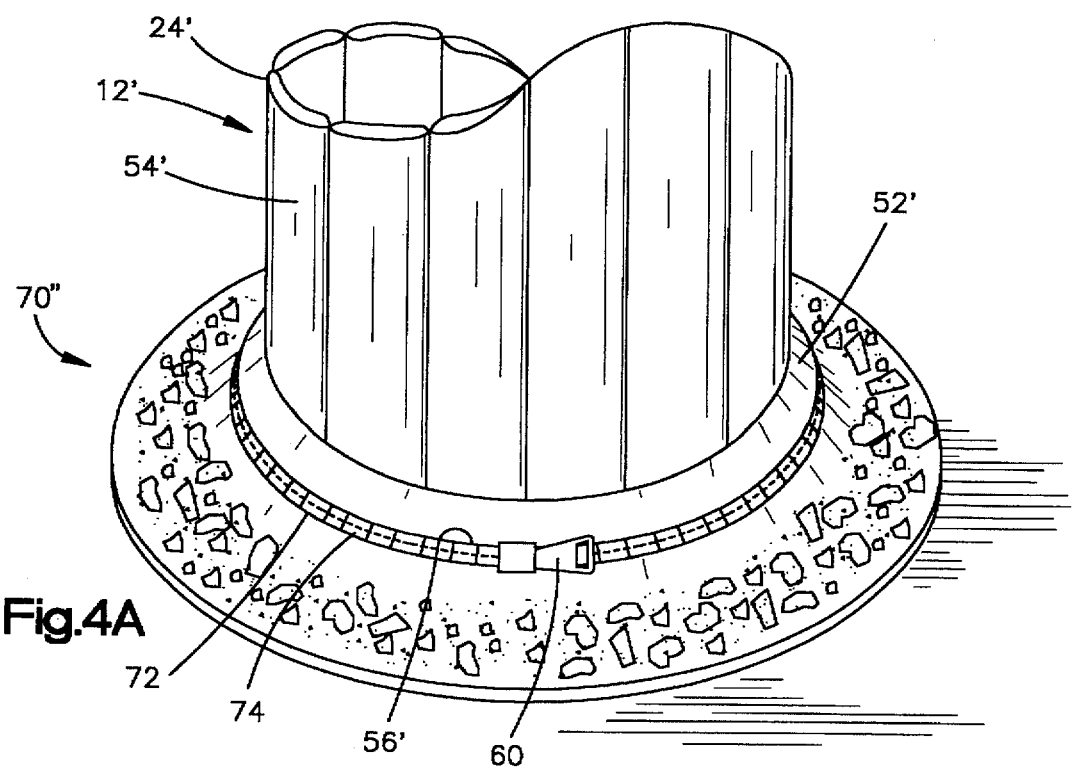
FIG. 4 is an enlarged perspective view of an alternate embodiment of an insulating jacket having a zippered skirt in place of the platform.
Figure 4:
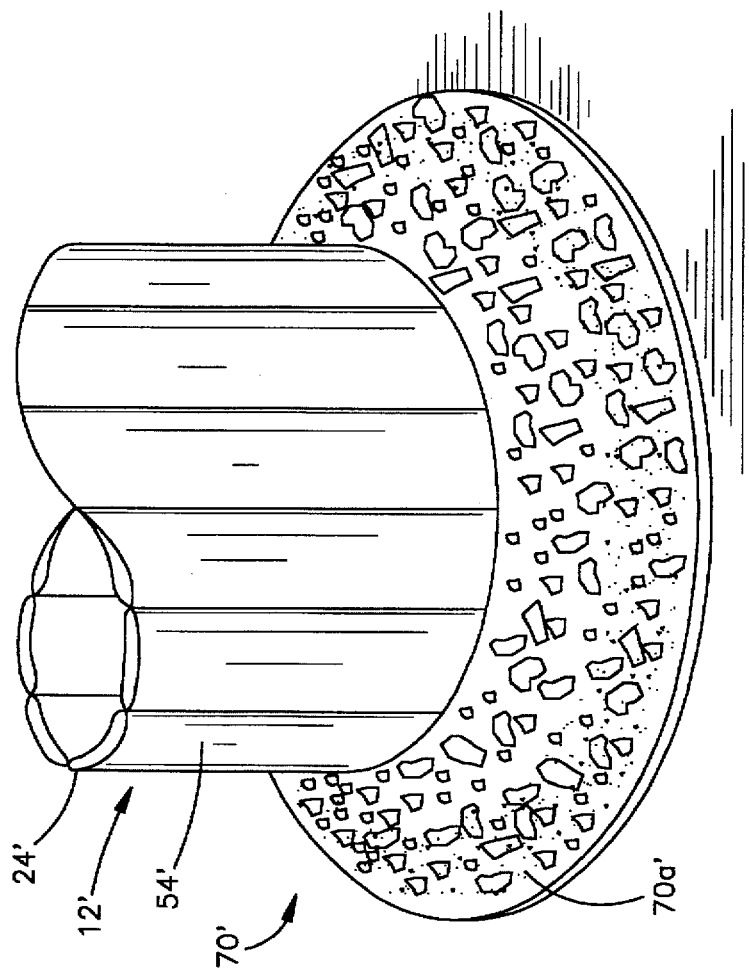

FIG. 4 illustrates an alternate embodiment of the self-standing, insulating jacket. In this embodiment, there is no platform. Instead, a skirt 70' is attached to an outer surface 54' of an outer member 24' of a hood 12' near and parallel to a lower peripheral edge (not shown) of the outer member 24'. The skirt 70' extends outwardly from the hood 12' and is preferably made of heavy gauge durable yet flexible plastic material. The skirt 70' is adhesively attached to the outer surface 54'. The tank (not shown) rests on gravel, stones, cement blocks, etc. The hood 12' is secured in place by covering some or all of an upper surface 70a' of the skirt 70' with earth, stones or other material to anchor the skin to the ground. To remove the hood 12' from the tank, the material covering the upper surface 70a' of the skirt 70' would be removed. Removal of the material permits the hood 12' (and attached skirt 70') to be raised up and over the tank and thereby removed. The advantage of this embodiment is reduced cost. No platform is required nor is any zipper provided to permit removal of the hood.

Another embodiment of an insulating jacket is shown in FIG. 4A. In this embodiment a skirt 70" is attached to the outer surface 54' of the outer member 24' of the hood 12' as in the embodiment shown in FIG. 4. However, in the FIG. 4A embodiment, the skirt 70" includes a longitudinal edge 72 having a zipper half 74. The zipper half 74 has a length substantially equal to a length of a zipper half 56'. The zipper half 56' extends along the edge of a strip 52' attached to the outer surface 54' of the outer member 24' of the hood 12'. The skirt 70" is placed around a bottom of the hood such that the skirt zipper half 74 is properly aligned with the zipper half 56'. A zipper fastener 60 is used to interlock the zipper halves 74, 56' thereby securing the hood 12' to the skirt 70". The portion of the skirt 70" extending outwardly and away from the zipper half 74 is suitably covered with earth, stones or other material to anchor the skirt to the ground. To remove the hood 12' from a tank (not shown) which is overlies, the zipper fastener 60 is used to disengage the zipper halves 74, 56' and permit the hood 12' (and the strip 52') to be raised up and over the tank and thereby removed.

While the preferred embodiment for practicing the present invention has been described in detail, it will be apparent that various modifications or alterations may be made therein without departing from the spirit and scope of the invention, set forth in the appended claims.

I claim:

1. An insulating jacket for a hot water tank comprising:
   a. a hood, surrounding but spaced outwardly from the tank, comprising an inner member and an outer member each of said inner and outer members defining an interior chamber having an open end and a peripheral edge surrounding said open end, said chamber defined by said outer member being larger than said chamber defined by said inner member, said inner and outer members being bonded together at or near their respective peripheral edges so as to form an impermeable pocket between said inner and outer members and said outer members having a valve permitting inflation and deflation of the impermeable pocket between said inner and outer members;
   b. a platform, disposed beneath such tank, having a diameter greater than an outer diameter of said hood and an upper surface which is relatively flat in the area overlied by the tank; and,
   c. attachment means for securing said hood to said platform.

2. The insulating jacket of claim 1 wherein the hood is transparent and said inner and outer members of said hood are comprised of transparent polyvinyl chloride.

3. The insulating jacket of claim 2 wherein said polyvinyl chloride has a thickness of 4 to 6 mil.

4. The insulating jacket of claim 1 wherein the attachment means is a zipper type fastener comprising two zipper halves and a zipper fastener for interlocking the two zipper halves, a first zipper half being attached to the top of the platform so as to surround said hood outer member, a second zipper half being attached to an outer surface of said hood outer member near and parallel to said outer member peripheral edge, said first and second zipper halves being aligned to facilitate interlocking the zipper halves with said zipper fastener.

5. The insulating jacket of claim 1 wherein the inner and outer members of the hood are pleated together along spaced apart parallel segments so as to form vertical channels for increased hood ridigity.

6. The insulating jacket of claim 4 wherein said upper surface of said platform includes a raised annular ridge surrounding the tank and said first zipper half is attached to said annular ridge.

7. An insulating jacket for a hot water tank comprising:
   a. a hood, surrounding but spaced outwardly from the tank, comprising an inner member and an outer member, each of said inner and outer members defining an interior chamber having an open end and a peripheral edge surrounding said open end, said chamber defined by said outer member being larger than said chamber defined by said inner member, said inner and outer members being attached at or near their respective peripheral edges so as to form an impermeable pocket between said inner and outer members, one of said inner and outer members having a valve permitting inflation and deflation of said pocket between the inner and outer members; and
   b. a skirt attached to one of said inner and outer members and extending outwardly beyond the peripheral edge of said one member, the skirt adapted to be covered with material to maintain a position of the hood overlying but spaced apart from the tank.

8. The insulating jacket of claim 7 wherein the hood is transparent and said inner and outer members of the hood are comprised of transparent polyvinyl chloride.

9. The insulating jacket of claim 8 wherein the polyvinyl chloride has a thickness of 4 to 6 mils.

10. The insulating jacket of claim 7 wherein the skirt is adhesively attached to the outer member near the peripheral edge of the member.

11. The insulating jacket of claim 7 wherein the skirt includes a first and a second part separably attached to the first part, the first part being attached to one of said inner and outer members and extending outwardly from the said one member, the second part extending outwardly from said first part and adapted to be covered with material to maintain a position of the hood overlying but spaced apart from the tank.

12. The insulating jacket of claim 11 wherein said first and second skirt parts are attached by a zipper type fastener comprising two zipper halves and a zipper fastener for interlocking the two zipper halves, a first zipper half being attached to an edge of the first skirt part, a second zipper half being attached to an edge of the second skirt part said first and second skirt parts having aligned edges to facilitate interlocking the zipper halves with said zipper fastener.

13. The insulating jack of claim 7 wherein the inner and outer members of the hood are pleated together along spaced apart parallel segments so as to form substantially vertical channels for increased hood ridigity.

* * * * *